S. O. Blanding,

Sifter.

No. 100,360. Patented Mar. 1, 1870.

Witnesses.
John L. Burk
Phil. F. Larner

Inventor.
Sanford O. Blanding

United States Patent Office.

SANFORD O. BLANDING, OF VINELAND, NEW JERSEY.

Letters Patent No. 100,360, dated March 1, 1870.

IMPROVED SIFTING-APPARATUS.

The Schedule referred to in these Letters Patent and making part of the same.

*To all whom it may concern:*

Be it known that I, SANFORD O. BLANDING, of the town of Vineland, county of Cumberland, in the State of New Jersey, have invented a certain new and useful Sifting-Apparatus, especially adapted for domestic uses.

My invention consists in mounting a sieve, provided with a suitable handle, upon pivoted legs, in order to readily obtain longitudinal action, and in providing the said legs with lugs, or their equivalents, upon their inner sides, fitted to engage with the bottom edge of the sieve at each limit of the longitudinal movement, and thus jolt the contents and secure a rapid and effectual sifting thereof; and I do hereby declare that the following specification, taken in connection with the drawings furnished and forming a part thereof, is a true and clear description of the same, reference being had to the drawings.

Corresponding letters indicate similar parts in both figures.

Figure 1:
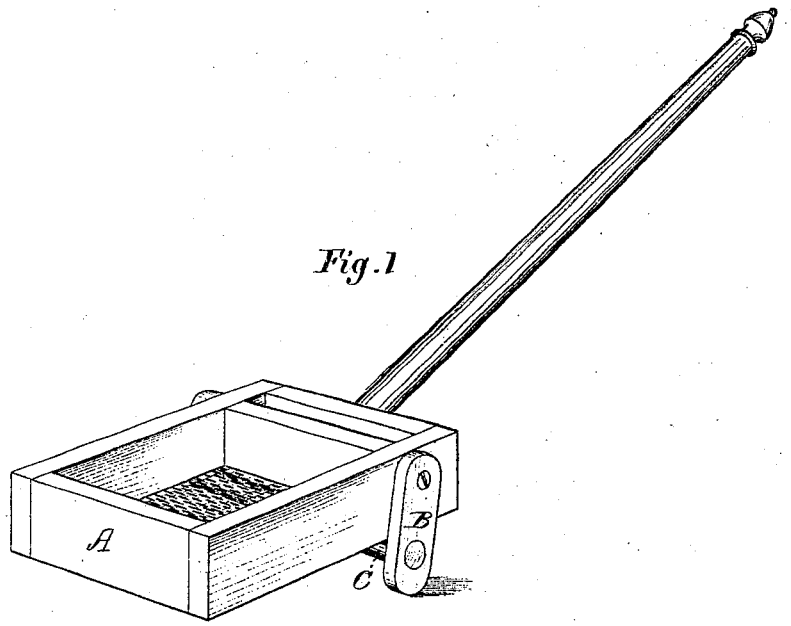
Figure 1 represents one of my sifters in perspective.
Figure 2:
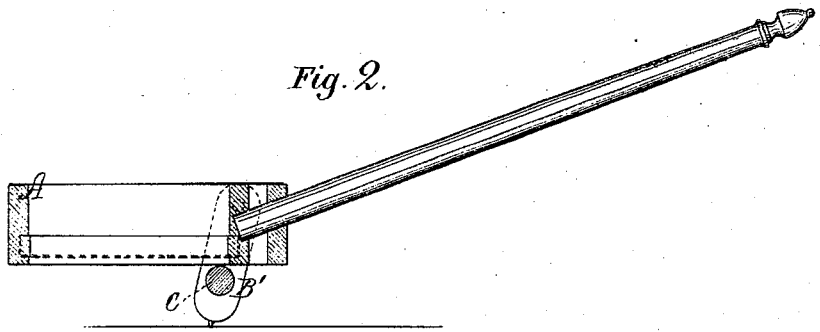
Figure 2 represents the same in longitudinal vertical section.

A represents the sieve proper. It is provided with a handle of suitable length, attached to one end at a convenient angle.

B and B' represent the legs. They are shown pivoted at their upper ends to the outer sides of the sieve. It is obvious that a desirable longitudinal action could be readily obtained were the legs entirely separate from each other. It is, however, preferable that they be united, in order that they shall always maintain regular and proper relations one to the other, for the purposes of evenly sustaining the weight of the sieve and its contents.

In the drawings I show beneath the bottom of the sieve a connecting-bar, C, extending from leg to leg, and securely fastened to each.

If the pivots of the legs be placed at a point to balance the sieve properly, a reciprocating longitudinal movement would cause the bottom of the sieve, at each turning-point, to strike heavily upon the connecting-bar, and by this jolting greatly facilitate the process of sifting.

It is evident that the connecting-rod might pass through the box of the sieve, and its ends be used virtually as pivots upon which the legs B should operate, they being securely fastened. In such case it would only be necessary to have projecting lugs on the inner faces of the legs, below the bottom of the sieve, upon which it would strike, the lugs serving the purpose of the connecting-rod when placed as shown in the drawings.

Having thus described my invention,

I claim as new, and desire to secure by Letters Patent—

In combination with the handled sieve A, the pivoted legs B, provided with suitable lugs or the connecting-bar C, substantially as shown and described.

SANFORD O. BLANDING.

Witnesses:
JOHN L. BURK,
PHIL. F. LARNER.